(12) United States Patent
Erlebach (10) Patent No.: US 11,766,821 B2
(45) Date of Patent: Sep. 26, 2023

(54) SHOWER PAN

(71) Applicant: Josef Erlebach, Silverthorne, CO (US)

(72) Inventor: Josef Erlebach, Silverthorne, CO (US)

(*) Notice: Subject to any disclaimer, the term of this patent is extended or adjusted under 35 U.S.C. 154(b) by 0 days.

(21) Appl. No.: 17/760,762

(22) PCT Filed: Oct. 21, 2021

(86) PCT No.: PCT/US2021/056121
§ 371 (c)(1),
(2) Date: Mar. 15, 2022

(87) PCT Pub. No.: WO2022/087320
PCT Pub. Date: Apr. 28, 2022

(65) Prior Publication Data
US 2023/0130582 A1 Apr. 27, 2023

Related U.S. Application Data

(60) Provisional application No. 63/094,564, filed on Oct. 21, 2020.

(51) Int. Cl.
*B29C 51/14* (2006.01)
*A47K 3/40* (2006.01)
(Continued)

(52) U.S. Cl.
CPC ............. *B29C 51/14* (2013.01); *A47K 3/40* (2013.01); *B29C 51/10* (2013.01); *B32B 3/266* (2013.01); *B32B 7/12* (2013.01); *B32B 27/065* (2013.01); *B32B 27/12* (2013.01); *B32B 27/36* (2013.01); *B32B 37/1207* (2013.01);
(Continued)

(58) Field of Classification Search
CPC ........... B29C 51/14; B29C 51/10; A47K 3/40; B32B 3/266; B32B 7/12; B32B 27/065; B32B 27/12; B32B 27/36; B32B 37/1207; B32B 38/0004; B32B 38/0012; B32B 38/145; B32B 2262/101; B32B 2266/0264; B32B 2307/7265; B32B 2367/00; B32B 2471/00; B41M 5/035; B29K 2067/003;
(Continued)

(56) References Cited

U.S. PATENT DOCUMENTS 5,010,352 A 4/1991 Takei et al.
6,878,336 B1 * 4/2005 Browning ............... B29C 51/10
264/238

(Continued)

FOREIGN PATENT DOCUMENTS

EP 1790498 5/2007
EP 2647322 A2 * 10/2013 ............... A47K 3/40
(Continued)

*Primary Examiner* — Christopher W Raimund
(74) *Attorney, Agent, or Firm* — Leyendecker & Lemire, LLC (57) ABSTRACT

A shower pan and method of manufacture are described. Embodiments of the shower pan can include, but are not limited to, a solid surface top layer and a PET second layer that can be thermoformed, molded, and laminated in a single step. The solid surface top layer can be approximately ⅛" to ¼" thick and the PET second layer can be approximately ⅞" to 1⅛" thick. The shower pan may further include a third layer being fiberglass.

19 Claims, 4 Drawing Sheets

(51) Int. Cl.
  B29C 51/10    (2006.01)
  B32B 3/26     (2006.01)
  B32B 7/12     (2006.01)
  B32B 27/06    (2006.01)
  B32B 27/12    (2006.01)
  B32B 27/36    (2006.01)
  B32B 37/12    (2006.01)
  B32B 38/00    (2006.01)
  B41M 5/035    (2006.01)
  B29K 67/00    (2006.01)
  B29K 105/04   (2006.01)
  B29L 31/00    (2006.01)

(52) U.S. Cl.
  CPC ...... *B32B 38/0004* (2013.01); *B32B 38/0012* (2013.01); *B32B 38/145* (2013.01); *B41M 5/035* (2013.01); *B29K 2067/003* (2013.01); *B29K 2105/04* (2013.01); *B29K 2995/0069* (2013.01); *B29L 2031/7696* (2013.01); *B32B 2262/101* (2013.01); *B32B 2266/0264* (2013.01); *B32B 2307/7265* (2013.01); *B32B 2367/00* (2013.01); *B32B 2471/00* (2013.01)

(58) Field of Classification Search
  CPC ........ B29K 2105/04; B29K 2995/0069; B29L 2031/7696
  See application file for complete search history.

(56) References Cited

U.S. PATENT DOCUMENTS

| 8,563,122 | B1* | 10/2013 | Roberts | B32B 27/065 |
| | | | | 428/347 |
| 2005/0266204 | A1 | 12/2005 | Abrams | |
| 2019/0142225 | A1* | 5/2019 | Rodriguez | A47K 3/40 |
| | | | | 4/613 |
| 2021/0076880 | A1* | 3/2021 | Welch | E03F 5/0408 |

FOREIGN PATENT DOCUMENTS

| FR | 2716102 A1 * | 8/1995 | ............... A47K 3/02 |
| WO | WO-2011095771 A1 * | 8/2011 | ............... A47K 3/40 |

* cited by examiner

SHOWER PAN

CROSS-REFERENCE TO RELATED APPLICATION

This application claims the benefit of U.S. Provisional Application No. 63/094,564, filed Oct. 21, 2020.

BACKGROUND

Finished shower pans, and shower pans intended to be tiled, are currently used in all sectors of the building industry, residential industry, hospitality industry, and healthcare industry. Current manufacturers focus on cleanability and maintenance. Of note, tiled shower pans are not a good option due to grout joints and the quality of labor force to install tiles correctly. As such, most hotels, hospitals, and residential customers look for finished shower pans including cultured marble (e.g., Mincey Marble), cast iron (e.g., Kohler cast iron shower pans), solid surface shower pans (e.g., Belstone solid surface shower pans), or solid surface clad shower pans that can be tiled (e.g., shower pans made by TileRedi).

However, currently available shower pans include several drawbacks. These drawbacks include shower pans that are heavy and very difficult to handle, ship, and install. Due to the heavy weight of the shower pans, the shower pans are very susceptible to breakage due to the weight of the shower pan and tight spaces where the shower pan is handled and installed.

Aesthetically, currently available shower pans do not look like they belong in high end properties or custom homes. The shower pans are very limited in choice of colors and patterns.

Further, currently available shower pans do not allow for size adjustability on-site, thus framing for the shower pan has to be adjusted to fit the shower pan when they do not fit. Solid surface shower pans (and other composite shower pans) often suffer thermal expansion after being installed. Due to thermal expansion, currently available shower pans expand up to 1%. This means the moment the shower pan is installed without precise spacing, the shower pan will release stress due to thermal expansion in a middle of the shower pan in an upwards direction. As can be appreciated, this increases the cost for installing said shower pan.

Lastly, currently available shower pans provide poor (or zero) waterproofing between an entry edge of the shower pan and the rest of the flooring in the bathroom.

A shower pan that can provide the following is needed: weight reduction of currently available shower pans without compromising an integrity of the shower pan; made with a solid surface (e.g., manufactured by Avonite Surfaces®) having good cleanability and anti-microbial properties; the use of high quality support materials (e.g., filler support, flanges, and sealants); the use of post-consumer recycled materials; providing size adjustability on-site during installation to reduce the cost of reframing a shower space; a rigid surface that can allow for a durable printed pattern and/or color onto the shower pan; making the shower pan shippable with common carriers to serve residential customers; minimal to no thermal expansion after installation; and making flanges around the shower pan that are easy to attach and waterproof after cutting the shower pan to size on-site.

DETAILED DESCRIPTION

Embodiments of the present invention include a shower pan and a method of manufacturing the shower pan. The shower pan can be typically be manufactured with desired dimensions and can include an image printed on a top of the shower pan. In one embodiment, the shower pan can include a first thin and durable layer and a second rigid backing layer to support the first layer. In another embodiment, the shower pan can include a first thin and durable layer, a second rigid backing layer, and a third thin rigid layer.

A novel method of manufacturing can be implemented to make the shower pan. The method of manufacture can include, but is not limited to, a dye sublimation printing process, thermoforming (or vacuum forming), molding, and lamination. Embodiments of the method of manufacture include combining the thermoforming, molding, and lamination into a single step.

In one embodiment, the shower pan can include a first layer and a second layer. The first layer (or top layer) can be comprised of a solid surface and can have a relatively thin thickness of approximately ⅛" to ¼" (approximately 2-6 mm). The second layer (or bottom layer) can be a rigid backing secured to the first layer. Typically, a thickness of the second layer can be approximately ⅞" to 1⅛" (approximately 22-29 mm) in thickness. Of note, the rigid backing may undergo a flattening process to ensure the bottom of the rigid backing is completely flat. As such, the thickness of the rigid backing may differ before and after manufacture of the shower pan. It is to be appreciated that other materials having similar properties to solid surface can be implemented. For instance, embodiments are contemplated where the first layer may be acryl based materials, polyvinyl chloride (PVC), and rubber.

In some instances, a thickness of a perimeter of the rigid backing can be at the pre-machined thickness, but the thickness may decrease getting closer to the drain location. For example, a thickness at the drain location may vary from ⅛" to ⅜" depending on a size of the shower pan and the location of the drain. In one embodiment, the second layer can be a rigid foam able to withstand elevated temperatures without compromising an integrity of the rigid foam.

Typically, the solid surface can include an image printed onto the solid surface via a dye sublimation printing process. In one instance, the solid surface can be adhered to the rigid backing via a thermally activated adhesive (e.g., hotmelt glue). The solid surface and the rigid backing can each include an aperture where a drain assembly can be installed.

As can be appreciated, in the manufacturing process, the aperture of the solid surface can be lined up with the aperture of the rigid backing. Of note, the thickness of the solid surface layer and the foam backing layer allow for the shower pan to be easily cut to size if needed at a jobsite.

The solid surface can be, but is not limited to, Corian®, Meganite®, or Avonite®. In one embodiment, the solid surface can have a 1" (~6 mm) thickness. In another embodiment, the solid surface can have a ⅛" (~3 mm) thickness. It is to be appreciated that other solid surface materials having varying thicknesses can be implemented.

To print an image on the solid surface, a process of dye sublimation and heating can be implemented. To sublimate the dye, the solid surface can be placed in an oven with a piece of transfer paper to heat the dye on the piece of transfer paper. Since the solid surface has to go through the heating process during printing, the solid surface may be thermoformed after being heated in the dye sublimation process. Further, a lamination process, which requires heat, can be performed while the solid surface and the rigid backing are being thermoformed and molded. As can be appreciated, the heating step during dye sublimation can provide sufficient heat to the solid surface to allow thermoforming, molding, and lamination to occur based on the initial heating during the dye sublimation printing process.

After the solid surface has been printed on, the solid surface can go through a thermoforming process, molding process, and a lamination process. Embodiments are contemplated where these three processes occur in one step. To allow for these three processes to be completed simultaneously, the rigid backing can be a material able to be heated without sustaining any structural damage or fatigue. For example, a rigid polyethylene terephthalate (PET) foam manufactured by Armacell® can be implemented. It is to be appreciated that other materials having similar characteristics to a rigid PET foam can be implemented and are not outside a scope of the present invention.

Several challenges are presented when trying to thermoform, mold, and laminate a solid surface to a rigid backing. More specifically, challenges arise when the first layer and the second layer are shaped and molded separately since it is very difficult, if not impossible, to match the exact shapes of the two layers and then mate them together. The challenges can include, but are not limited to: a perfect mating of the rigid backing and the solid surface due to the thickness of the solid surface that may potentially fail if the solid surface is not 100% supported by the rigid backing; ensuring that the rigid backing is not structurally damaged (e.g., melted) when laminating; ensuring a bottom of the shower pan is perfectly flat for installation; and ensuring the dye sublimation image on the shower pan surface is not damaged during thermoforming, molding, and lamination.

To overcome these challenges, the described shower pan may be manufactured using a process where after the solid surface is printed with an image, the shower pan can undergo the thermoforming process, molding process, and lamination process in a single step. To allow for these processes to be completed simultaneously, the following may be implemented: thermoforming, molding, and lamination can be completed in a vacuum press; a high temp PET foam with good adhesion to thermally activated adhesives can be used; a computer numerical control (CNC) router using a wide flat cutter head can be used to flatten a bottom side of the shower pan; and coated medium-density fibreboard (MDF) molds can be used.

Of significant note, the method implemented to construct the shower pan can have no effect on a thermal expansion (length or width) of the shower pan during a temperature exchange test. Solid surface and other composite shower pans suffer up to 1% thermal expansion during a temperature exchange test. As can be appreciated, this means that the moment a shower pan is installed without enough dilatation space, the shower pan will release this stress (thermal expansion) in an upwards move in a middle of the shower pan.

Described hereinafter is one example method of manufacturing the shower pan. It is to be appreciated that one or more steps may be completed in a different order than presented. In some embodiments, the dye sublimation printing process can be replaced with heating the solid surface sheet prior to putting the solid surface sheet into the vacuum press.

First, the rigid backing (e.g., rigid PET foam) can be cut to a predetermined thickness and coated with a thermally activated adhesive (e.g., a hotmelt glue). The thermally activated adhesive can be applied to a first side of the rigid backing. Of note, the thermally activated adhesive can remain on the rigid backing for weeks on end.

Second, an image can be mirror printed on a transfer paper in a predetermined size and quality matching a size of a sheet of solid surface material.

Third, the sublimation oven can be pre-heated to the necessary temperature. The image on the transfer paper can be laid on a table right-side up and can be covered by the sheet of solid surface material that may be placed upside down directly on to the transfer paper and image. Typically, clamps can be implemented to hold the transfer paper in place to the solid surface sheet. The solid surface sheet can include a hole for a shower drain. In some instances, the hole may be predrilled into the solid surface before the transfer paper is secured to the solid surface sheet. In other instances, the hole may be drilled after the dye sublimation printing process is complete. When the dye sublimation oven gets to the correct temperature, the solid surface sheet and the transfer paper can be placed inside the oven with the transfer paper side heated up and pressed with vacuum.

Fourth, when the dye sublimation printing process is complete, the solid surface sheet can be pulled out of the oven and the transfer paper can be removed quickly to retain as much heat energy as possible. As previously mentioned, the thermal energy from the dye sublimation printing process can be used in the thermoforming process, molding process, and lamination process.

Fifth, the solid surface sheet can be placed on an MDF mold in a vacuum press printed side down. The thermally activated adhesive coated rigid backing sheet can be placed over the bottom side of the solid surface sheet in the mold. Indexing (placement of the rigid backing on the solid surface sheet) can be achieved by matching the hole in the solid surface sheet to a pre-formed hole in the rigid backing sheet. Of significant note, due to the thermal energy (i.e., heat) still in the solid surface sheet, the inactive thermally activated adhesive may be reactivated and pressed onto the solid surface sheet and locked in the vacuum press for thermoforming, molding, and lamination.

Sixth, the printed, molded, and laminated shower pan can be pulled out of the vacuum press after a predetermined amount of time. Once the shower pan has been removed, the shower pan can be refined. In one instance, a cutting tool can trim the shower pan to a predetermined size and shape. After the shower pan has been cut to size, the shower pan can go through a CNC flattening procedure. The CNC flattening procedure can include, but is not limited to, the shower pan being held in a vacuum to the same shape mold as the shower pan was molded over in the vacuum press. A large router bit can be implemented to remove excess material from a bottom surface of the shower pan (i.e., the bottom of the rigid backing). As can be appreciated, the bottom surface of the rigid backing can be substantially flat after being machined with the large router bit.

Embodiments are contemplated where the shower pan can be prepped for installation by including waterproofing flanges and a waterproofing membrane attached proximate an entry of the shower pan. Typically, these components can be secured to the shower pan when the shower pan is ready for installation. As previously mentioned, shower pans are sometimes modified after arriving at a jobsite to ensure a proper fit. As such, the waterproofing components can be secured and installed when the shower pan has been properly sized, if needed on-site.

In one example, the waterproofing flanges can be made of clear vinyl strips 2.5" wide, an ethylene propylene diene monomer (EPDM) rubber foam tape, and a sealant. The EPDM rubber foam tape can be implemented as a spacer. By including the spacer, the sealant can be easily inserted between the solid surface and the waterproofing strips. The waterproofing membrane located at the bottom of the front (or entry) edge of the shower pan can be included to provide solid waterproofing between the shower pan and the rest of the bathroom flooring. In one example, the waterproofing membrane can be made of a strip of standard topical sheet waterproofing membrane (e.g., the same clear vinyl strips used for all the flanges) and a double-sided tape.

Embodiments of the present invention include several different types of drains to be implemented with the shower pan. For example, a standard no-caulk brass shower drain can be implemented in one instance. In another instance, a shuffle drain system can be implemented with the shower pan. In yet another instance, the drain outlet can be shifted when necessary due to obstacles in the way. Of note, the shower pan can be formed such that the top surface of the shower pan can be concave and funnel down to a drain hole. The mold can be implemented to shape the solid surface during the thermoforming, molding, and lamination processes.

Embodiments of the present invention can implement: (i) the use of a ⅛" (up to 4") thick solid surface as a surface for a shower pan; (ii) the use of 100% post-consumer recycled PET foam as backing to be able to use ⅛" thick solid surface material as finish; (iii) coating of the PET foam with reactivatable hotmelt (thermally activated adhesive) for lamination; (iv) a dye sublimation process that provides the thermal energy for reactivating the hotmelt glue on the surface of the PET foam backing to make thermoforming and lamination to the PET foam backing possible in one step; (v) and attaching flanges to the sides of the shower pan after being cut to size on site with double sided foam tape as a spacer for caulking application; attaching a waterproofing flange to the front (or entry) side of the shower pan for integration with the rest of the waterproofing in the bathroom.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

A Shower Pan

Figure 1:
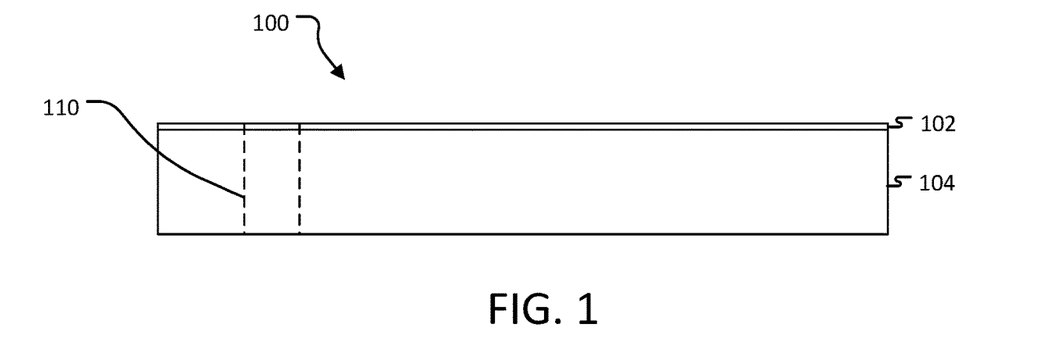
FIG. 1 is a side view of a shower pan according to one embodiment of the present invention.

Referring to FIG. 1, a side view of an embodiment 100 of a shower pan is illustrated. The shower pan 100 can be implemented to provide a lightweight, customizable shower pan that can be easily cut to size on a job site. Further, due to the thin top layer, the shower pan 100 can e lightweight lending to easier mobility and reduced shipping costs.

As shown in FIG. 1, the shower pan 100 can include, but is not limited to, a first layer 102 and a second layer 104. In one instance, the first layer 102 (or top layer) can be comprised of a solid surface. It is to be appreciated that other materials having similar properties to solid surface can be implemented. The top surface 102 can have a relatively thin thickness of approximately ⅛" to ¼" (approximately 2-6 mm). Generally, the top layer 102 can be manufactured from a durable material designed for use in wet environments.

The second layer 104 (or bottom layer) can be a rigid backing secured to the top layer 102. A thickness of the bottom layer can be approximately ⅞" to 1⅛" (approximately 22-29 mm) in thickness. Embodiments are contemplated where the thickness of the bottom layer 104 can be approximately 15-30 mm. In one instance, the second layer can be a polyethylene terephthalate (PET) foam.

In some embodiments, the bottom layer 104 may undergo a flattening process to ensure a bottom of the bottom layer is completely flat. As such, a thickness of the bottom layer may differ before and after manufacture of the shower pan 100.

Figure 2:
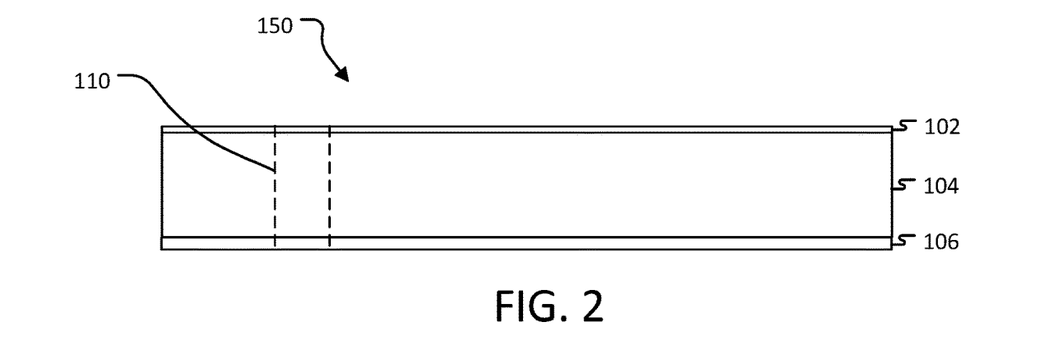
FIG. 2 is a side view of a shower pan according to one embodiment of the present invention.

Referring to FIG. 2, a second embodiment 150 of a shower pan is illustrated. As shown in FIG. 2, the shower pan 150 can include, but is not limited to, the first layer 102, the second layer 104, and a third layer 106. In some embodiments, before the third layer 156 can be secured to the second layer 104 (now a middle layer), the second layer 104 may undergo a flattening process to ensure a bottom of the second layer 104 is completely flat. The third layer 106 (now a bottom layer) can be comprised of a lightweight and rigid material. In one example, fiberglass can be implemented as the third layer 106. Typically, the third layer 106 can be approximately ⅛" to ¾" (approximately 2-19 mm) thick. In such an embodiment, the third layer 106 can be coupled to the second layer 104 via a thermally activated adhesive. Typically, the first layer 102 can be thermoformed, molded, and laminated with the second layer 104 prior to the third layer 106 being coupled to the second layer 104.

Figure 3:
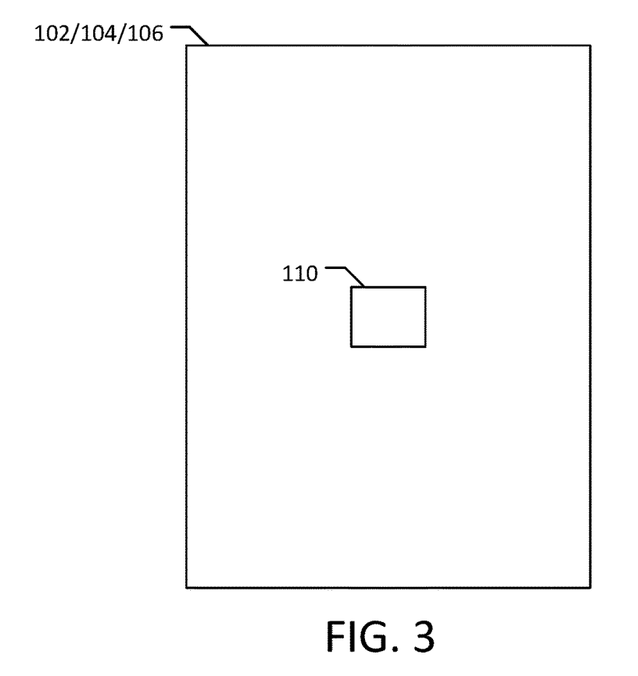
FIG. 3 is a top view of a first layer, second layer, or third layer of a shower pan according to one embodiment of the present invention.

Referring to FIG. 3, a top view of the first layer 102, the second layer 104, or the third layer 106 is shown. Of note, each of the layers 102, 104, 106 can include a hole 110 for receiving a portion of a drain assembly therethrough. Although a rectangular hole is shown, it is to be appreciated that other shapes for the drain assembly are contemplated and not outside a scope of the present invention. For instance, the drain hole 110 may be a long rectangular shape. In another instance, the drain hole 110 may be circular. Of significant note, the drain holes 110 of each layer 102, 104, 106 can be implemented to index the layers together when forming the shower pan.

Embodiments are contemplated where a drain adapter can be secured to the shower pan 100 during manufacture and after manufacture. In some instances, a drain adapter can be laminated to the second layer 104 during the manufacturing process. More specifically, the drain adapter can be placed on top of the second layer in a vacuum press with a thermally activatable adhesive provided between the drain adapter and the second layer 104. In other instances, the drain adapter can be adhered to a bottom of the shower pan 100 after the shower pan has been formed. Typically, a waterproof adhesive can be implemented to secure the drain adapter to the shower pan 100 proximate the hole 110. The drain adapter can be provided to allow a drain assembly to couple to the shower pan 100.

Figure 4:
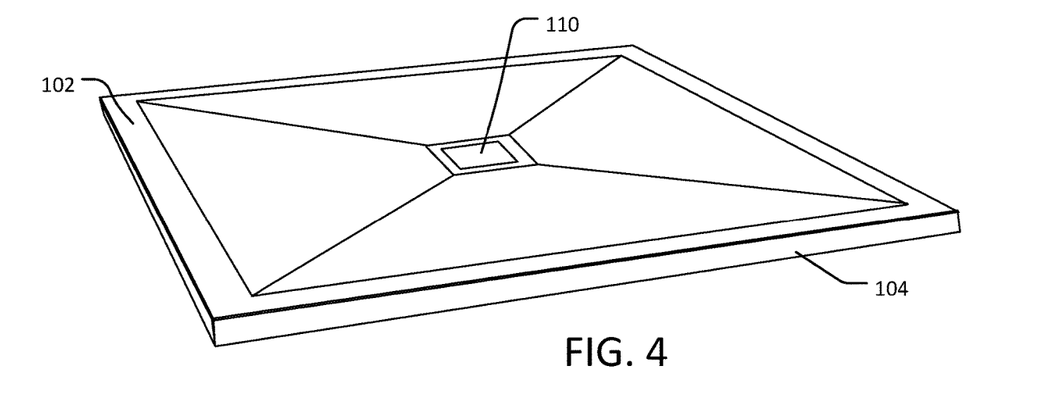
FIG. 4 is a perspective view of a shower pan according to one embodiment of the present invention.

Referring to FIG. 4, a perspective view of the shower pan 100 is shown. The shower pan 100 can include the hole 110 through each of the layers 102, 104 for receiving a drain assembly therethrough. As shown, the top surface of the first layer 102 can be concave and slope down towards the drain hole 110.

Figure 5:
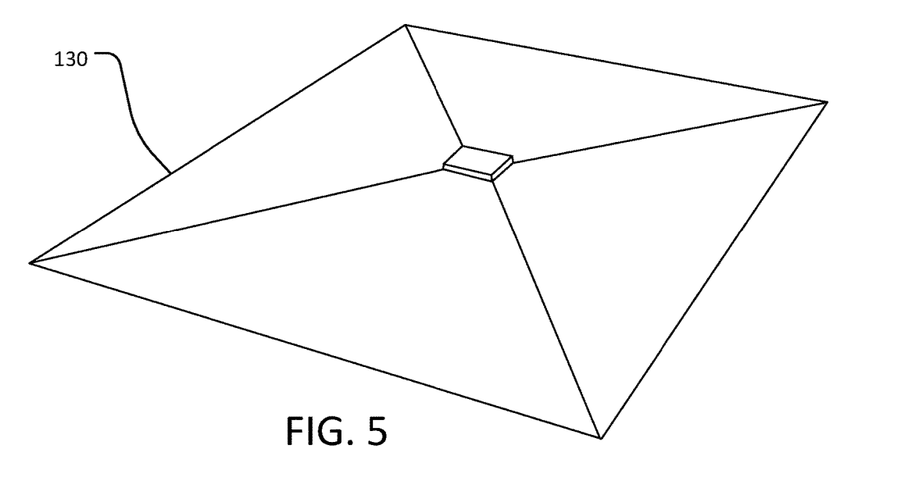
FIG. 5 is a perspective view of a shower pan mold according to one embodiment of the present invention.

Referring to FIG. 5, a perspective view of a mold 130 for thermoforming and molding the shower pan 100 is illustrated. During the manufacturing of the shower pan 100, the first layer 102 and the second layer 104 can be thermoformed and molded to have a concave top surface via the mold 130. It is to be appreciated that a design of the mold can be changed depending on the design of a shower pan being made. Typically, the mold 130 can be made from a medium-density fibreboard (MDF) that can be coated to protect the MDF mold. It is to be appreciated that other materials having similar properties to MDF can be implemented as the mold.

Figure 6:
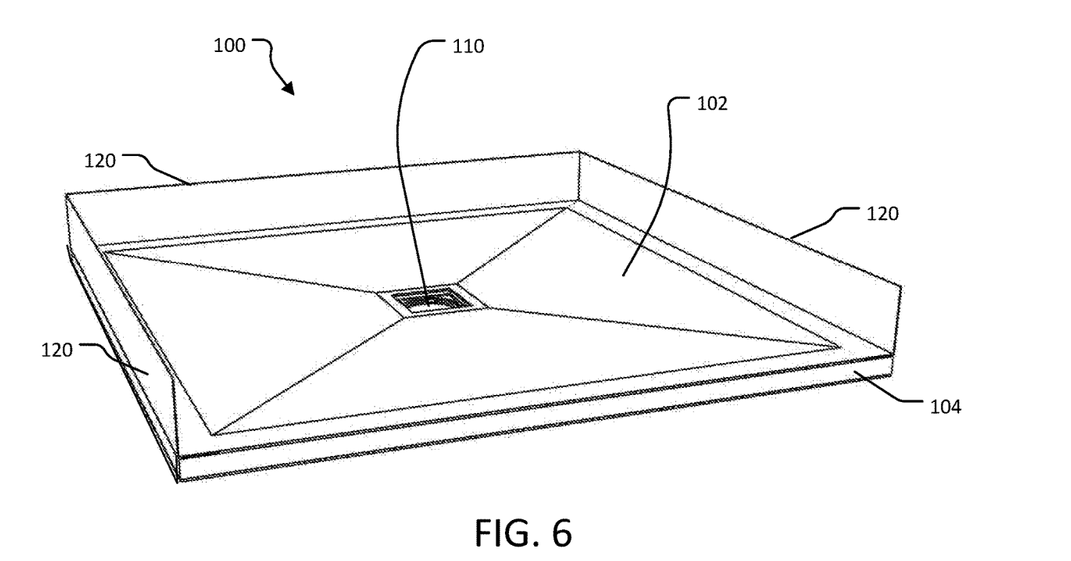
FIG. 6 is a perspective view of a shower pan according to one embodiment of the present invention.

Referring to FIG. 6, a perspective view of the shower pan 100 including waterproofing flanges 120 secured to sides of the shower pan 100 is illustrated. In one example, the waterproofing flanges 120 can include, but are not limited to, a waterproofing member, a spacer, and a sealant. The waterproofing member can be made of clear vinyl strips 2.5" wide. The spacer can be an ethylene propylene diene monomer (EPDM) rubber foam tape. By including the spacer, the sealant can be easily inserted between the solid surface and the waterproofing strips. A waterproofing membrane located at the bottom of the front (or entry) edge of the shower pan 100 (not shown) can be included to provide solid waterproofing between the shower pan 100 and the rest of the bathroom flooring. In another example, the waterproofing membrane can be made of a strip of standard topical sheet waterproofing membrane (e.g., the same clear vinyl strips used for all the flanges) and a double-sided tape. As previously mentioned, the shower pan 100 can be cut to size on a job-site, if needed, and then the waterproofing flanges 120 and waterproofing membrane can be secured to the shower pan 100 before installation.

Figure 7:
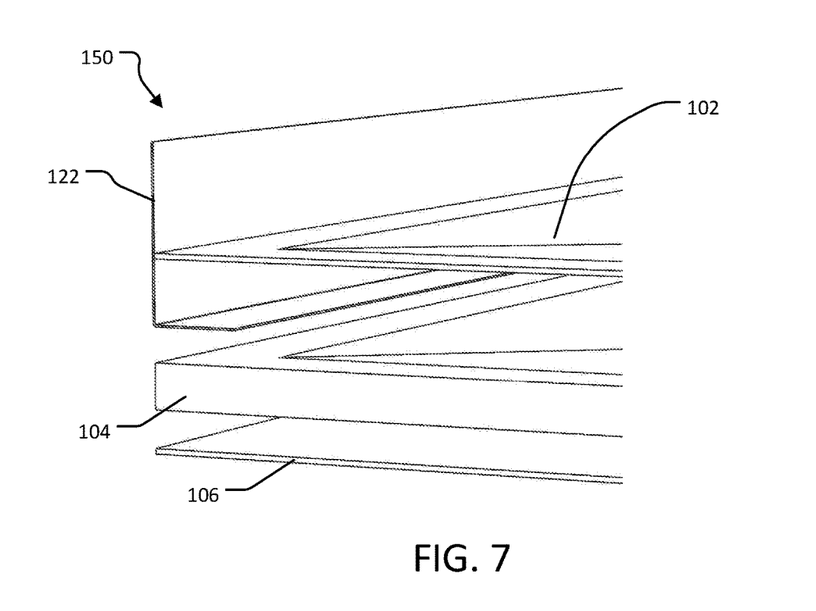
FIG. 7 is a close-up, exploded view of a shower pan according to one embodiment of the present invention.

Referring to FIG. 7, a partial exploded view of the shower pan 150 including an integrated waterproofing membrane 122 is shown. In some embodiments, the integrated waterproofing membrane 122 can be implemented with the shower pan 100. As shown, a portion of the waterproofing flange 120 can be sandwiched between the first layer 102 and the second layer 104. During manufacture of the shower pan 150 (or the shower pan 100), the waterproofing membranes 122 can include a thermally activated adhesive on a first side of the flanges 122. The waterproofing membranes 122 can be placed proximate a periphery of the first layer 102 prior to placing the second layer 104 on top of the first layer 102 and placing them all into a vacuum press. The first side of the waterproofing membranes 122 can be facing the first layer 102. As can be appreciated, during the vacuum press process, the flanges 122 can adhere to the first layer 102 and the second layer 104 and be sandwiched between the two. In one example, the waterproofing membrane 122 can be made from a material that can bond to the PET layer via heat without any additional adhesive being used.

Figure 8:
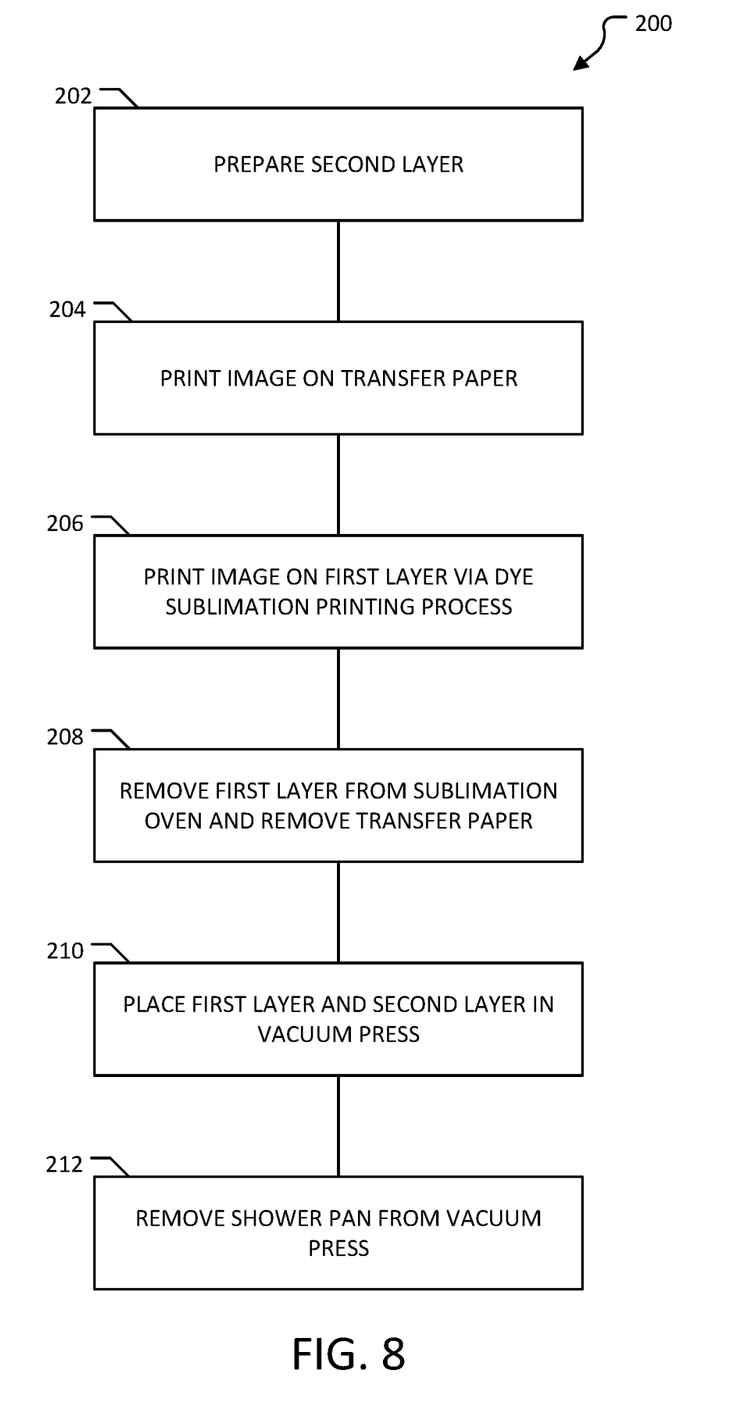
FIG. 8 is a flow diagram of a method for manufacturing a shower pan according to one embodiment of the present invention.

Referring to FIG. 8, a flow diagram of a method (or process) 200 for manufacturing the shower pan 100 (or the shower pan 150) is illustrated.

In block 202, the second layer 104 (e.g., a rigid PET foam board) can be cut to a predetermined thickness and coated with a thermally activated adhesive (e.g., a reactivatable hotmelt glue). The thermally activated adhesive can be applied to a first side of the second layer 104. Of note, the thermally activated adhesive can remain on the second layer 104 for weeks on end.

In block 204, an image can be mirror printed on a transfer paper having a predetermined size and quality. Typically, the transfer paper can match a size of a sheet of solid surface material for the first layer 102. In some embodiments, this step and the next step may be replaced with a single step of heating the first layer 102 in an oven to a predetermined temperature.

In block 206, the image from the transfer paper can be printed onto the first layer 102 via a dye sublimation printing process. To begin the dye sublimation printing process, a sublimation oven can be pre-heated to a predetermined temperature need to sublimate the dye. The image on the transfer paper can be laid on a table right-side up and can be covered by first layer 102 (e.g., a sheet of solid surface material) that may be placed upside down directly on to the transfer paper and image. Typically, clamps can be implemented to hold the transfer paper in place to the first layer 102. In some instances, a drain hole may be predrilled into the first layer 102 before the transfer paper is secured to the first layer 102. In other instances, the hole may be drilled after the dye sublimation printing process is complete. When the dye sublimation oven gets to the correct temperature, the first layer 102 and the transfer paper can be placed inside the oven with the transfer paper side up and pressed with vacuum.

In block 208, when the dye sublimation printing process is complete, the first layer 102 can be pulled out of the oven and the transfer paper can be removed quickly to retain as much heat energy as possible. As previously mentioned, the thermal energy from the dye sublimation printing process can be used in the thermoforming process, molding process, and lamination process.

In block 210, the first layer 102 can be placed on an MDF mold in a vacuum press with a printed side of the first layer 102 facing down. The thermally activated adhesive coated second layer 104 can be placed over the bottom side of the first layer 102 in the mold with the thermally activated adhesive side facing the bottom side of the first layer 102. Indexing (placement of the second layer 104 on the first layer 102) can be achieved by matching the hole in the first layer 102 to a pre-formed hole in the second layer 104. Of significant note, due to the thermal energy (i.e., heat) still in the first layer 102, the inactive thermally activated adhesive may be activated (or reactivated) and pressed onto the first layer 102 and locked in the vacuum press for thermoforming, molding, and lamination.

In block 212, the printed, molded, and laminated shower pan 100 can be pulled out of the vacuum press after a predetermined amount of time. Once the shower pan 100 has been removed, the shower pan 100 can be refined. In one instance, a cutting tool can trim the shower pan 100 to a predetermined size and shape. After the shower pan 100 has been cut to size, the shower pan 100 can go through a CNC flattening procedure. The CNC flattening procedure can include, but is not limited to, the shower pan 100 being held in a vacuum to the same shape mold as the shower pan was molded over in the vacuum press. A large router bit can be implemented to remove excess material from a bottom surface of the shower pan 100 (i.e., the bottom of the second layer 104). As can be appreciated, the bottom surface of the second layer 104 can be substantially flat after being machined with the large router bit.

Where the third layer 106 may be included, the process 200 can include another step of laminating the third layer 106 to the second layer 104. Typically, the third layer 106 can be secured to the second layer 104 via a thermally activated adhesive. In one instance, the shower pan 100 (after having the second layer 104 flattened) can be heated to a predetermined heat. The shower pan 100 and the third layer 106 (coated with a thermally activated adhesive on one side) can be placed in the vacuum press to secure the third layer 106 to the second layer 104.

Figure 9:
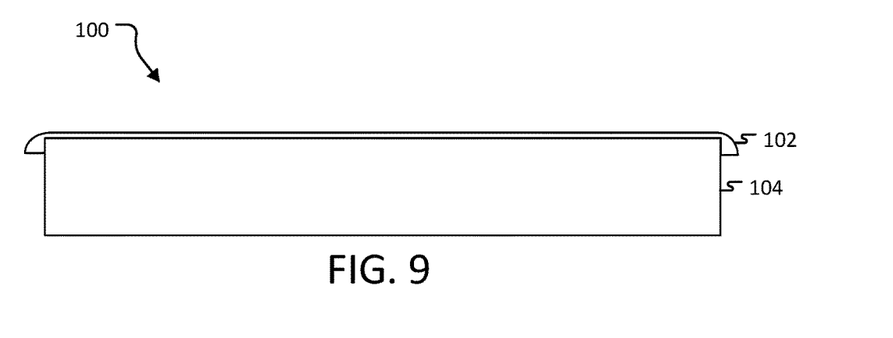
FIG. 9 is a front view of a shower pan according to one embodiment of the present invention.

Referring to FIG. 9, a front view of the shower pan 100 is shown. Of note, embodiments are contemplated where the first layer 102 can be slightly wider and/or longer than the second layer 104 such that when the two layers are thermoformed, molded, and laminated, ends of the first layer 102 can bend down to cover a portion of a side of the second layer 104. In other instances, the ends of the first layer 102 can cover the sides of the second layer 104 entirely such that the second layer 104 may not be visible except from looking at a bottom of the shower pan 100. Typically, this can be done to provide a finished look for the shower pan 100. It is to be appreciated that one, two, three, or all four sides of the top layer 102 can be bent down depending on a particular installation. Of note, the mold 130 can be designed to allow for the sides of the first surface 102 to bend.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

APPENDICES

Appendix A—Page 1 includes a cross-sectional view of an example embodiment of a shower pan mating with an end cap comprised and manufactured similarly to the shower pan 100. Example materials for the components are included. Page 2 includes several detailed diagrams of a shower pan where the first layer covers all sides, except the bottom side, of the second layer. Further shown is the first layer prior to being thermoformed and molded. Example measurements for the example embodiment of the shower pan are included. Page 3 includes detailed diagrams of one example embodiment of a shower pan. A drain assembly is shown integrated with the shower pan.

I claim:

1. A process for manufacturing a shower pan, the process including:
   providing a solid surface sheet having a thickness of approximately ⅛ inches to ¼ inches;
   providing a polyethylene terephthalate (PET) board having a thickness of approximately ⅞ inches to 1 ⅛ inches, the PET board including a thermally activated adhesive on one side;
   using a dye sublimation printing process to print an image on the solid surface sheet, the dye sublimation printing process including heating the solid surface sheet;
   placing the heated solid surface sheet and the PET board in a vacuum press, the vacuum press including a mold; and
   thermoforming, molding, and laminating the solid surface sheet and the PET board together to form the shower pan;
   wherein the heated solid surface sheet is the only source of heat during the step of thermoforming, molding, and laminating the solid surface sheet and the PET board.

2. The process of claim 1, wherein the thermally activated adhesive is thermally activated from the heated solid surface sheet.

3. The process of claim 1, further including the step of: flattening a bottom of the PET board.

4. The process of claim 3, further including the steps of: providing a fiberglass sheet; and
   laminating the fiberglass sheet to a bottom of the shower pan.

5. The process of claim 1, wherein the PET board is waterproof.

6. The process of claim 1, further including the steps of: providing one or more waterproofing membranes including a thermally activated adhesive on a first side;

placing the one or more waterproofing membranes proximate a periphery of the solid surface sheet prior to placing the PET board and the solid surface sheet into the vacuum press;

wherein (i) the first side of the one or more waterproofing membranes interface with the solid surface sheet, and (ii) a portion of the one or more waterproofing membranes extends out past the periphery of the solid surface sheet and the PET board.

7. The process of claim 1, wherein the solid surface sheet and the PET board each include a hole for receiving a drain therethrough.

8. The process of claim 7, further including the step of:
indexing the PET board with the solid surface sheet via the holes.

9. A process for manufacturing a shower pan, the process including:
providing a solid surface sheet having a thickness of approximately 1/8 inches to 1/4 inches and a hole for receiving a drain therethrough;
providing a polyethylene terephthalate (PET) board having a thickness of approximately 7/8 inches to 1 1/8 inches and a hole for receiving a drain therethrough, the PET board including a thermally activated adhesive on one side;
providing a fiberglass sheet;
using a dye sublimation printing process to print an image on the solid surface sheet, the dye sublimation printing process including heating the solid surface sheet;
placing the heated solid surface sheet and the PET board in a vacuum press, the vacuum press including a mold;
indexing the PET board with the solid surface sheet by aligning the drain holes;
thermoforming, molding, and laminating the solid surface sheet and the PET board together to form the shower pan, the heat from the solid surface sheet being the only source of heat;
removing the shower pan from the vacuum press; and
laminating the fiberglass sheet to a bottom of the shower pan.

10. The process of claim 9, further including the step of:
attaching a waterproofing membrane to the shower pan proximate an entry to the shower pan.

11. The process of claim 9, further including the step of:
cutting the shower pan to size at a job site.

12. The process of claim 11, further including the step of:
attaching waterproofing flanges to sides of the shower pan after being cut to size with double sided foam tape as a spacer for caulking application.

13. The process of claim 9, wherein the PET board is 100% post-consumer recycled PET.

14. The process of claim 9, wherein the solid surface sheet, the PET board, and the fiberglass sheet have approximately the same length and width.

15. The process of claim 9, wherein the fiberglass sheet includes a hole to receive a drain therethrough.

16. The process of claim 15, wherein the fiberglass sheet is indexed with the shower pan via the holes of the solid surface sheet and the PET board and the hole of the fiberglass sheet.

17. The process of claim 9, wherein the PET board is cut to size and coated with the thermally activated adhesive prior to being provided.

18. The process of claim 9, wherein the fiberglass sheet can be laminated to the bottom of the shower pan after a bottom of the PET board goes through a flattening process.

19. A process for manufacturing a shower pan, the process including:
using a dye sublimation printing process to print an image on a solid surface sheet, the dye sublimation printing process including heating the solid surface sheet in an oven;
removing the heated solid surface sheet from the oven;
placing the heated solid surface sheet face down on a mold in a vacuum press;
indexing a polyethylene terephthalate (PET) board on top of the heated solid surface sheet in the vacuum press, the PET board including a thermally activated adhesive that is activated from the heat of the solid surface sheet; and
thermoforming, molding, and laminating the solid surface sheet and PET board together, the heat from the solid surface sheet being the only source of heat.

* * * * *